Figure 1:
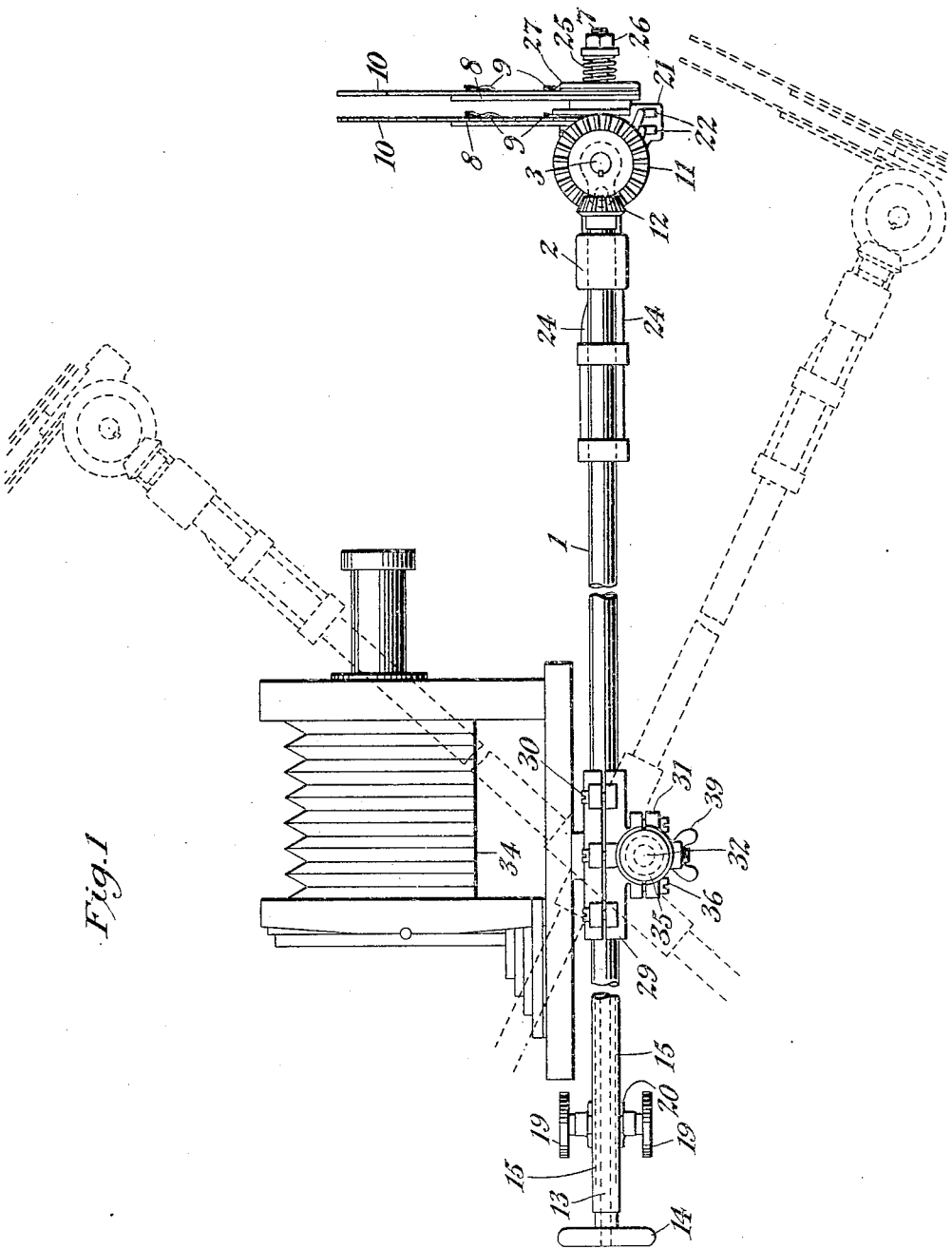

A. W. DREYFOOS.
VIGNETTER.
APPLICATION FILED JAN. 29, 1914.

1,118,640.

Patented Nov. 24, 1914.
2 SHEETS—SHEET 1.

Witnesses:
Chas. D. King
Rosamond M. Coane

Inventor:
Alexander W. Dreyfoos
by Lester W. Dittenhoefer
Attorney.

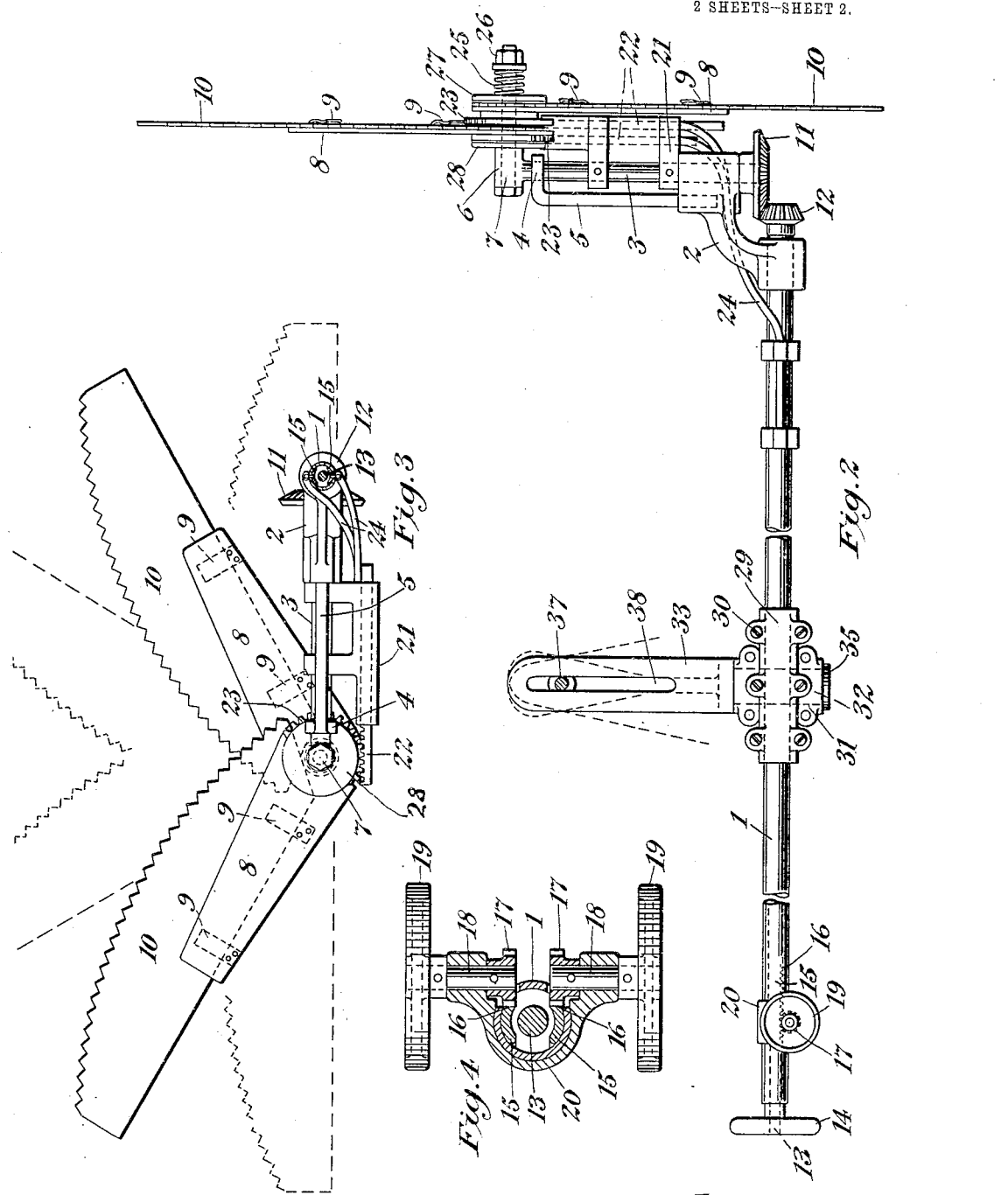

UNITED STATES PATENT OFFICE.

ALEXANDER W. DREYFOOS, OF MOUNT VERNON, NEW YORK, ASSIGNOR OF ONE-HALF TO HENRY OBSTFIELD, OF NEWARK, NEW JERSEY.

VIGNETTER.

1,118,640. Specification of Letters Patent. Patented Nov. 24, 1914.

Application filed January 29, 1914. Serial No. 815,131.

*To all whom it may concern:*

Be it known that I, ALEXANDER W. DREYFOOS, a citizen of the United States, residing in the city of Mount Vernon, county of Westchester, and State of New York, have invented certain new and useful Improvements in Vignetters, of which the following is a specification.

My invention relates to a vignetter adapted to be interposed between the camera and the subject to be photographed.

The principal object of my invention is to provide a vignetting device having two screens capable of being adjusted angularly with relation to each other whereby to obtain a variable masking of the subject to be photographed and to provide a simple mechanism for effecting said adjustment.

Another object is to provide a mechanism for tilting the screens toward or away from the camera lens whereby to secure variations in light reflection.

A further object is to provide a support for the screens which support is readily attachable to the camera and which is capable of bodily adjustments longitudinally, angularly in a vertical plane, and angularly in a horizontal plane, so as to permit of movement of the screens into various positions with respect to the lens.

The device is constructed so that by a simple manipulation of the movable parts, any or all of the several adjustments may be easily effected while the operator is focusing the camera. Any desired vignetting or masking of the photographic subject may be readily obtained by means of the various adjustments afforded in my improved device.

To these ends the invention consists in certain novel features of construction and arrangement of parts, which will be fully described herein and particularly pointed out in the claims.

I attain the objects specified as well as others not herein enumerated by means of the device shown in the accompanying drawings in which, Figure 1 is a side elevation showing the vignetter in full lines in one position, and in dotted lines in several other adjusted positions. Fig. 2 is a top plan view of the device. Fig. 3 is a transverse view showing the adjustable vignetting screens in full lines in one adjustment, and in dotted lines in two other angular adjustments, and Fig. 4 is a detail transverse section through the support, showing the pinions for operating the screen adjusting rods.

Similar reference characters refer to similar parts throughout the several views.

The device consists, generally, of an adjustably mounted support, having a laterally extending rotatable arm, carrying two radially movable wings or screen holders, each of which is capable of being separately adjusted to vary the angular relation between the screens; it is provided with means for rotating the arm to permit of tilting the screens, and it is further provided with separate means for effecting the angular adjustment of the screens.

In the particular embodiment of the invention illustrated in the drawings, 1 represents the main supporting tube of the device carrying at its forward end a bracket 2. A laterally extending arm or shaft 3 is rotatably journaled, at its inner end, in said bracket and at its opposite end, in the sleeve 4 depending from the rod 5 fixed to the bracket.

The outer end of the rotatable shaft 3, adjacent the bearing 4, is provided with a head 6 in which is secured a pin 7 projecting therefrom in a direction normal to the axis of the arm 3, and serving as a pivot or bearing for the vignetting screen holders or wings 8. The two wings 8 are mounted loosely on the pin 7 so as to be movable radially thereabout. Each of the wings is provided with a plurality of spring clips 9 adapted to removably hold the vignetting cards or screens 10.

One of the principal features of my invention consists in the provision of card or screen holders which are capable of being adjusted with relation to each other so that the shape of the opening between the edges of the screens and the angular relation of the screens themselves may be modified as desired. The screen holders described are well-suited for the purpose intended but any other suitable form of holders may be employed.

From an inspection of Fig. 3 it will be apparent that according to my improved construction a wide range of vignetting effects may be obtained with a single set of screens.

The screens may be moved equally toward or away from each other to obtain symmetrical openings of various widths, or either or both screens may be moved so as to vary their angular relation and thereby obtain a differential masking of the subject to be photographed. By employing screens of different shapes, further variations in the contour of the openings may be secured.

To permit of tilting the screens toward or away from the lens, I provide the rotatable shaft 3, with a bevel gear 11, meshing with the gear 12 fixed to the forward end of the shaft 13 which shaft extends centrally through the tube 1, and is rotatably supported therein. The rear end of the shaft 13 is provided with a hand wheel 14 whereby said shaft may be turned, in either direction, so as to tilt the screens in any desired angle.

A suitable mechanism is provided to effect the angular adjustments of the screens with relation to each other. In the form shown, this mechanism consists of two endwise movable adjusting rods 15. The rods are preferably of a segmented shape in cross section and they are mounted in the tube 1 at opposite sides of the shaft 13, as best seen in Fig. 4. Each of the rods is provided, through a part of its length, with a rack 16 engaging one of the pinions 17. The pinions are carried on the spindles 18 which are provided with hand wheels 19 and are supported, transversely of the tube 1, in bearings formed at the ends of the collar or yoke 20, fixed to the supporting tube, near its rear end. Rigidly fastened to the shaft 3 is a U shaped bracket 21 having guideways formed therein for supporting the slidable racks 22. A series of teeth 23, engaging with said racks, are formed in the edges of the wings or screen holders 8 adjacent to the pin 7 on which the wings radiate. The teeth are arranged concentrically with the pin and are of a sufficient number to permit of radial movement of the wings, each through an arc extending a little over a quarter of a circle.

While I prefer to swing the screen holders 8 by means of the racks 22 and teeth 23 as shown, any other suitable construction may be employed for the purpose.

A flexible connection 24, such as a strand of wire slidable in a spirally wound sheathing, serves to transmit the motion of each of the adjusting rods 15 to its companion rack 22, and thereby to actuate the wings 8. This flexible form of connection, permits of the screen being tilted with respect to the lens without in any manner interfering with the operation of the mechanism for adjusting the angular relation of the screens with respect to each other. By a simple manipulation of either or both of the adjusting rods 15, as by means of the hand wheels 19 or other suitable actuating device, either or both, as the case may be, of the screens 10 may be raised or lowered into desired position. Suitable frictional resistance should be provided to maintain the screens in their adjusted positions; to this end, I employ a tension spring 25 which acts against the nut 26, carried on the end of the pin 7, to press the loose friction washers 27 and the loosely mounted wings 8 into frictional contact with the fixed disk 28. By screwing the nut 26, the tension of the spring 25 may be adjusted as desired.

A clamp 29, of any suitable construction, is provided to support the tube 1, and to permit longitudinal adjustment thereof. As shown, the clamp consists of two members, preferably having their clamping surfaces lined with leather or other suitable gripping material, held together by screws 30 and arranged to exert a sufficient clamping action to hold the tube and to permit of its being longitudinally adjusted by merely pushing it forward or pulling it backward. If desired the screws 30 may be tightened to secure the tube in any adjusted position. In order to prevent the tube from turning, while being adjusted, it is preferably keyed in the clamp.

To permit of angular adjustments of the vignetter tube in a vertical plane, I provide a second clamp 31 secured transversely to the clamp 29 and engaging the boss 32 formed at the outer end of the plate 33 whereby the vignetter is attached to the camera 34. The cap 35 at the end of the boss prevents the clamp 31 from slipping off. When desired the vignetter may be swung out of the field of the lens, as shown by the dotted lines in Fig. 1, and held in such positions by tightening the clamping screws 36.

The attaching plate 33 is formed with a slot 38 through which the bolt 37 is passed in fastening the vignetter to the camera. A winged nut 39 screwed to the bolt 37, holds the vignetter in place and permits of its being adjusted angularly in a horizontal plane by swinging the plate into various positions around the bolt as a center.

In compliance with the statutory requirements, I have herein described and shown a preferred form of the embodiment of my invention but I do not intend to limit myself to the details of construction set forth, except in so far as I may be limited by the terms of the annexed claims, as I am aware that various changes and modifications can be made therein without departing from the scope of this invention.

What I claim and desire to secure by Letters Patent is:

1. In a vignetter, a support adapted for attachment to a camera, a plurality of radially adjustable vignetting screens carried thereon, and means operable from the rear of the camera for separately adjusting each screen with relation to the others.

2. In a vignetter, a support adapted for attachment to a camera, a masking device carried thereon composed of a plurality of screens pivotally adjustable about a common center, and means for separately adjusting each screen.

3. In a vignetter, a support adapted for attachment to a camera, and a masking device having a vignetting opening of variable contour carried thereon, said mask being composed of a plurality of screens each of which is capable of independent angular adjustments to vary the contour of the vignetting opening.

4. In a vignetter, a support adapted for attachment to a camera, a plurality of vignetting screens swingably carried thereon, means for separately swinging each screen, and means for maintaining the screens in adjusted positions.

5. A vignetter comprising a support, two screens adjustably supported thereby, means for tilting both screens as a unit, and means for adjusting each screen in angular relation to the other.

6. A vignetter comprising an adjustably mounted support, a plurality of screens adjustably carried thereon, means for tilting the screens with relation to the support, and means operable from the rear of the camera for adjusting each screen angularly with relation to the others.

7. A vignetter comprising a longitudinal adjustable support, two screens adjustably carried thereon, means for tilting both screens as a unit, and means operable from the rear of the camera for independently adjusting each screen angularly with relation to the other.

8. A vignetter comprising a support, a laterally extended rockable arm, a plurality of screen holders pivotally supported thereon, means for rocking said arm to tilt the screen holders, and means for separately swinging each screen holder about its pivot in a lateral plane.

9. A vignetter comprising a support, a laterally extended rotatable arm, a plurality of movable screen holders radially supported thereon, means for rotating the arm to tilt the screen holders, and means including flexibly connected rods for swinging each holder in a lateral plane into angularly adjusted positions.

10. A vignetter comprising an adjustably mounted tubular support, a laterally extended rotatable arm, two movable screen holders radially mounted on a pin projecting from said arm, a shaft extending through the tubular support and operatively connected to the lateral arm for rotating the same, two adjusting rods mounted for endwise movement in the tubular support, means for separately moving each of said rods, two members carried on the lateral arm each operatively connected to a screen holder for moving it about its center, and a flexible connection between each adjusting rod and its companion screen holder actuating member.

In testimony whereof I have hereunto affixed my signature in the presence of two subscribing witnesses.

ALEXANDER W. DREYFOOS.

Witnesses:
S. G. MAGUIRE,
EDNA WILLIAMS.